3,238,233
OPTIONALLY 17-ALKYLATED 2-METHYLENE-5α-ANDROSTANE - 3β,17β - DIOLS AND ESTERS THEREOF
Paul D. Klimstra, Northbrook, and Raymond E. Counsell, Skokie, Ill., assignors to G. D. Searle & Co., Chicago, Ill., a corporation of Delaware
No Drawing. Filed Aug. 21, 1962, Ser. No. 218,440
8 Claims. (Cl. 260—397.5)

The present invention pertains to novel steroids of the androstane series, characterized by a methylene substituent at the 2-position, and especially to optionally 17-alkylated 2-methylene-5α-androstane-3β,17β-diols and esters thereof, represented by the structural formula

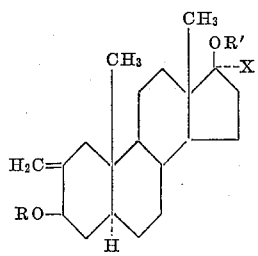

wherein R and R' can be hydrogen or a lower alkyanoyl radical, and X can be hydrogen or a lower alkyl radical.

The lower alkanoyl radicals symbolized by R and R' are exemplified by formyl, acetyl, propionyl, butyryl, valeryl caproyl, and the branched-chain isomers thereof. Typical of the lower alkyl radicals indicated by X are methyl, ethyl, propyl, butyl, pentyl, hexyl, and the branched-chain groups isomeric therewith.

The preferred method of manufacture of the compounds of this invention utilizes optional 17-alkylated 17-oxygenated-androstan-3-ones of the structural formula.

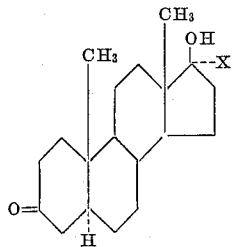

wherein X is hydrogen or a lower alkyl radical, as starting materials. These substances are allowed to react with formaldehyde and a dialkyamine, suitably as the hydrochloride, to afford the corresponding 2α-dialkylamino-methyl compounds, which are reduced, for example, by means of tri-(tertiary-butoxy) lithium aluminum hydride, to produce the 3-hydroxy derivatives. Oxidation of the latter substances, typically with perbenzoic acid, affords the corresponding N-oxides, which are heated in a suitable inert high-boiling solvent to produce the instant 2-methylene substances. As a specific example of these processes, 17β-hydroxy - 17α - methyl - 5α - androstan-3-one is contacted with dimethylamine hydrochloride and aqueous formaldehyde in ethanol to yield 17β - hydroxy - 17α - methyl - 2α - dimethylaminomethyl 5α-androstan-3-one, which substance is allowed to react with tri-(tertiary-butoxy) lithium aluminum hydride in tetrahydrofuran to afford 17α-methyl-2α-dimethylaminomethyl-5α-androstane-3β,17β-diol. Reaction of that substance in chloroform with a benzene solution of perbenzoic acid affords the corresponding N-oxide, which is heated in tertiary-butyl toluene at the reflux temperature, yielding 17α-methyl-2 - methylene-5α - androstane-3β,17β-diol.

The lower alkanoyl esters of this invention are conveniently obtained by contacting the aforementioned 2α-dialkylaminomethyl 3β,17β-diols with a lower alkanoic acid anhydride in the presence of an acid acceptor, then successively submitting the resulting alkanoates to the above-described oxidation and thermal decomposition reactions. 2α-dimethylaminomethyl-5α-androstane-3β,17β-diol 3,17-diacetate, for example, is contacted, in chloroform, with a benzene solution of perbenzoic acid, resulting in the corresponding tertiary amine oxide, which substance is heated in tertiary-butyl toluene solution to yield 2-methylene-5α-androstane-3β,17β-diol 3-17-diacetate.

An alternate process for the manufacture of the 3,17-diols of this invention involves reaction of the corresponding 2-hydroxymethylene-3-ones with a suitable reducing agent. A specific illustration of this process is the reaction of 17β-hydroxy-2-hydroxymethylene-17α-methyl-5α-androstane-3-one with lithium aluminum hydride in tetrahydrofuran to afford 17α-methyl-2-methylene-5α-androstane-3β,17β-diol.

The instant 3,17-diols can be obtained also by hydrolysis of the corresponding alkanoates. As a specific example, 2-methylene-5α-androstane-3β,17β-diol 3,17-diacetate is contacted with potassium hydroxide in aqueous methanol to produce 2-methylene-5α-androstane-3β,17β-diol.

The compounds of the present invention display valuable pharmacological properties. They are, for example, hormonal and anti-hormonal agents as is evidenced by their androgenic, anabolic, and anti-estrogenic activity.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight except where otherwise noted.

*Example 1*

To a solution of 15 parts of 17β-hydroxy-17α-methyl-5α-androstan-3-one and 25 parts of dimethylamine hydrochloride in 103 parts of ethanol is added 21 parts of 38% aqueous formaldehyde, and the resulting mixture is heated at reflux for about 2 hours, then is stored at room temperature for about 15 hours. The reaction mixture is acidified by the addition of approximately 200 parts of dilute hydrochloric acid, then is further diluted with 500 parts of water. This aqueous mixture is extracted with ether, then is cooled by the addition of ice and made alkaline by means of aqueous sodium carbonate. The resulting precipitate is collected by filtration, washed with water, then recrystallized from ethel acetate to afford needle-like crystals of 17β-hydroxy-17α-methyl-2α-dimethylaminomethyl-5α-androstane-3-one, M.P. about 161–163°; [α]$_D$= −33° (chloroform). This substance displays infrared maxima at about 2.74, 3.38, 3.58, 5.83, 6.85, 7.22, and 10.72 microns.

*Example 2*

By substituting 14.4 parts of 17β-hydroxy-5α-androstan-3-one and otherwise proceeding according to the processes of Example 1, 17β-hydroxy-2α-dimethyl-aminomethyl-5α-androstan-3-one is obtained. This substance displays a double melting point at 154–157° and 225–245° and is further characterized by an optical rotation of −15° and infrared maxima at about 2.74, 3.38, 3.58, 5.82, 7.20, 9.60, and 9.85 microns.

*Example 3*

The substitution of 15.8 parts of 17α-ethyl-17β-hydroxy-5α-androstan-3-one in the process of Example 1 results in 17α-ethyl-17β-hydroxy-2α-dimethylaminomethyl - 5α - androstan-3-one, which compound is obtained as an oil. A solution of this amine in ether is treated with isopropanolic hydrogen chloride, and the resulting precipitate is recrystallized from ethanol-acetone to afford the corresponding amine hydrochloride, M.P. about 203–205° (decomposition).

*Example 4*

To a solution of 20 parts of 17β-hydroxy-17α-methyl-2α-dimethylaminomethyl-5α-androstan-3-one in 266 parts of tetrahydrofuran, cooled to 0–5°, is added, with stirring, a cooled solution of 45 parts of tri-(tertiary-butoxy) lithium aluminum hydride in 266 parts of tetrahydrofuran. This reaction mixture is then stirred for about 20 minutes longer, while it is allowed to warm gradually to room temperature. It is then poured into about 3500 parts of a mixture of ice and water containing 210 parts of glacial acetic acid. The resulting aqueous solution is washed with ether, then is made alkaline by the addition of concentrated aqueous sodium carbonate, and is finally extracted with chloroform. The organic layer is separated, washed with water, dried over anhydrous potassium carbonate containing decolorizing carbon, then is stripped of solvent at reduced pressure to afford a white solid residue. Recrystallization of this residue from acetone produces pure 17α-methyl-2α-dimethylaminomethyl-5α-androstane-3β,17β-diol, which melts at about 235–236.5°.

*Example 5*

A mixture of 4 parts of 17α-methyl-2α-dimethylamine-methyl-5α-androstane-3β,17β-diol, 21.6 parts of acetic anhydride, and 11 parts of triethylamine is stirred at room temperature for about 16 hours, then is poured into approximately 125 parts of water. The resulting aqueous mixture is cooled and is made alkaline by the addition of 5% aqueous sodium carbonate. The resulting precipitate is collected by filtration, washed on the filter with water, and dried in air. Recrystallization from aqueous methanol results in pure 3β-acetoxy-17α-methyl-2α-dimethylaminomethyl-5α-androstan-17β-ol, M.P. about 220–224° (dec.). It is characterized further by an optical rotation in chloroform of −69°.

*Example 6*

A mixture of 3.5 parts of 2α-dimethylaminomethyl-5α-androstane-3β,17β-diol, 5 parts of acetic anhydride and 35 parts of pyridine is stored at room temperature for about 16 hours, then is poured into approximately 75 parts of a mixture of ice and water. The resulting aqueous mixture is made alkaline by the dropwise addition of 4 N aqueous sodium hydroxide, and the resulting precipitate is collected by filtration, then is washed on the filter with water and dried to yield 2α-dimethylaminomethyl-5α-androstane-3β,17β-diol, 3,17-diacetate, which compound displays a double melting point of 96–99° and 117–121°.

Recrystallization of this material first from aqueous acetone, then from pentane yields a pure sample, melting at about 127–128.5°.

*Example 7*

To a slurry of 36 parts of tri-(tertiary-butoxy) lithium aluminum hydride in 222 parts of tetrahydrofuran, cooled in an ice bath, is added with stirring a solution of 16 parts of 17α-ethyl-17β-hydroxy-2α-dimethylaminomethyl-5α-androstan-3-one in 222 parts of tetrahydrofuran. Stirring is continued for about 1½ hours, after which time the mixture is poured into 1500 parts of ice and water containing 315 parts of acetic acid. The resulting aqueous mixture is washed with chloroform, then is made alkaline by the addition of saturated aqueous sodium carbonate, and is extracted with chloroform. The chloroform layer is washed with water, dried over anhydrous potassium carbonate, and stripped of solvent at reduced pressure to afford an oily residue. Crystallization from aqueous acetone results in 17α-ethyl - 2α - dimethylaminomethyl - 5α - androstane-3β,17β-diol, melting at about 169–173°.

*Example 8*

To a solution of 2 parts of 2α-dimethylaminomethyl-5α-androstane-3β,17β-diol 3,17-diacetate in 75 parts of chloroform is added 10 parts by volume of a 1.54 N perbenzoic acid solution in benzene while the reaction mixture is kept at 0–5°. After the addition is complete, the mixture is allowed to stand at room temperature for about 20 minutes, then is washed successively with 10% aqueous sodium carbonate, 10% aqueous sodium iodide, and 1% aqueous sodium thiosulfate. This organic solution is then dried over anhydrous sodium sulfate and stripped of solvent at reduced pressure. The resulting residue is dissolved in 10 parts by volume of tertiary-butyl toluene, and the resulting solution is heated at the reflux temperature for about 30 minutes, then is cooled and diluted with ether. Successive washing with dilute hydrochloric acid and water affords an organic solution, which is dried over anhydrous sodium sulfate and concentrated to dryness in vacuo. The resulting residue is crystallized from methanol to afford pure 2-methylene-5α-androstane-3β,17β-diol 3,17-diacetate, melting at about 117.5–119° and characterized further by the structural formula

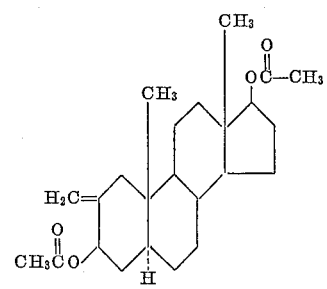

*Example 9*

To a solution of 2 parts of 2α-dimethylaminomethyl-17α-methyl-5α-androstane-3β,17β-diol 3-acetate in 75 parts of chloroform is added, at 0–5° over a period of about 5 minutes, 8 parts by volume of a 1.54 N perbenzoic acid solution in benzene. The reaction mixture is allowed to stand for about 30 minutes longer, then is washed successively with 10% aqueous sodium carbonate and water. Drying over anhydrous sodium sulfate followed by distillation of the solvent at reduced pressure affords a glassy residue, which is mixed with 50 parts by volume of tertiary-butyl toluene and heated at the reflux temperature for about 20 minutes. Distillation of the solvent at reduced pressure affords a glassy residue, which is recrystallized from aqueous methanol to produce pure 17α-methyl-2-methylene-5α-androstane-3β,17β-diol 3-acetate, melting at about 126–127°. It is further characterized by the structural formula

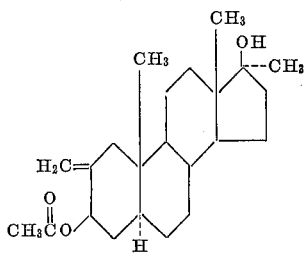

Example 10

To a solution of 2 parts of 17α-methyl-2-methylene-5α-androstane-3β,17β-diol 3-acetate in 44 parts of methanol is added dropwise, with heating and stirring, a solution of 1.5 parts of potassium carbonate in 20 parts of water. Heating is continued until the mixture becomes homogeneous, at which time the solution is allowed to cool slowly. The product which precipitates is collected by filtration and dried to afford 17α-methyl-2-methylene-5α-androstane-3β,17β-diol, melting at about 219–223°. It is characterized further by the structural formula

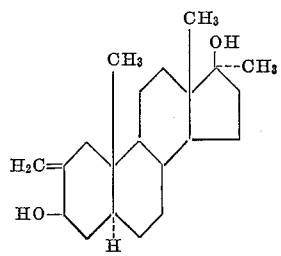

Example 11

To a solution of 2 parts of 17α-methyl-2α-dimethylaminomethyl-5α-androstane-3β,17β-diol in 75 parts of chloroform is added, at 4°, 17 parts by volume of a 0.351 N solution of perbenzoic acid in benzene. This reaction mixture is stored at room temperature for about 15 minutes, then is washed with 30% aqueous sodium hydroxide. The alkaline washings are extracted with chloroform, and this chloroform extract is combined with the original chloroform solution. The latter organic solution is dried over anhydrous sodium sulfate, then is stripped of solvent at reduced pressure to afford 17α-methyl-2α-dimethylaminomethyl-5α-androstane-3β,17β-diol N-oxide, melting at about 224–226°.

A mixture of one part of 17α-methyl-2α-dimethylaminomethyl-5α-androstane-3β,17β-diol N-oxide with 50 parts by volume of tertiary-butyl toluene is heated at the reflux temperature for about 4 hours, then is concentrated to dryness at reduced pressure. The residual solid is extracted with chloroform, and the chloroform extract is washed successively with dilute hydrochloric acid and 5% aqueous sodium bicarbonate, then is dried over anhydrous potassium carbonate containing decolorizing carbon, and finally is stripped of solvent at reduced pressure. The residual solid is triturated with pentane, then is recrystallized from hexane to yield 17α-methyl-2-methylene-5α-androstane-3β,17β-diol, identical with the product of Example 10.

Example 12

To a refluxing mixture of one part of lithium aluminum hydride in 44.4 parts of tetrahydrofuran is added, dropwise with stirring, a solution of 6.65 parts or 17β-hydroxy-2-hydroxymethylene-17α-methyl-5α-androstan-3-one in 35.5 parts of tetrahydrofuran. Stirring at the reflux temperature is continued for about 3 hours longer, at which time the mixture is cooled to room temperature and diluted by the dropwise addition of 9 parts of ethyl acetate. To this mixture is then successively added concentrated aqueous sodium sulfate and anhydrous sodium sulfate, and the resulting inorganic salts are removed by filtration. The filtrate is concentrated to dryness at reduced pressure, and the resulting residue is extracted with hot benzene. This benzene extract is concentrated to approximately ⅔ volume, then is allowed to cool, and the resulting precipitate is collected by filtration. Recrystallization of this crude product from aqueous ethanol affords 17α-methyl-2-methylene-5α-androstane-3β,17β-diol, melting at about 216–219° and identical with the product of Example 10.

Example 13

A mixture of 2 parts of 2-methylene-5α-androstane-3β,17β-diol 3,17-diacetate, 78 parts of methanol, 20 parts of water and one part of potassium hydroxide is heated on the steam bath for about one hour, then is diluted with water to the first point of turbidity and allowed to cool to room temperature. The resulting product which crystallizes from the mixture is collected by filtration and washed on the filter with water to afford crude 2-methylene-5α-androstane-3β,17β-diol, melting at about 173–176°. Recrystallization from methanol affords needles of the pure substance melting at about 179–182°, and characterized further by the structural formula

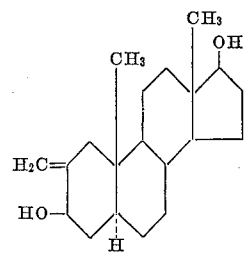

Example 14

To a refluxing slurry of 3.8 parts of lithium aluminum hydride and 125 parts of purified dioxane is added, with stirring, a solution of 10 parts of 17β-hydroxy-2-hydroxymethylene-5α-androstan-3-one in 250 parts of purified dioxane, and heating at the reflux temperature is continued for about 2 hours. The excess reagent is then decomposed by the successive addition of a solution of 3.8 parts of water in 50 parts of dioxane, 3.8 parts of 4 N aqueous sodium hydroxide, and 13.3 parts of water. The resulting mixture is allowed to cool to room temperature, and the precipitated salts are removed by filtration, then washed on the filter with isopropyl alcohol. Distillation of the solvent from the filtrate affords a residue, which is dissolved in a mixture of 200 parts of pyridine and 10 parts of acetic anhydride, which mixture is stored at room temperature for about 24 hours, then is poured into about 1000 parts of water. The supernatant aqueous mixture is decanted from the gummy precipitate, which is extracted into ether. This ether extract is washed successively with water, dilute hydrochloric acid, and water, then is dried over anhydrous sodium sulfate and concentrated to dryness at reduced pressure. The resulting oily residue is dissolved in benzene and adsorbed on a silica gel chromatographic column. Elution of the column with 2% ethyl acetate in benzene affords crude 2-methylene-5α-androstane-3β,17β-diol 3,17-diacetate. Recrystallization from aqueous methanol affords the pure substance, melting at about 117.5–119° and identical with the product of Example 8.

Further elution of the column with 5% ethyl acetate in benzene affords 2-formyl-5α-androst-2-en-17β-ol 17-acetate, melting at about 158.5–162.5° and displaying an ultraviolet absorption maximum of about 231 millimicrons with a molecular extinction coefficient of about 12,750.

The chromatographic column is then eluted with 10% ethyl acetate in benzene to afford 2α-acetoxymethyl-5α-androstane-3β,17β-diol, 3,17-diacetate, melting at about 156.5–158°.

Example 15

The reaction of 4.19 parts of 17α-ethyl-2α-dimethylaminomethyl-5α-androstane-3β,17β-diol with 27.5 parts of propionic anhydride by the procedure described in Example 5 results in 17α-ethyl-2α-dimethylaminomethyl-5α-androstane-3β,17β-diol 3-propionate.

Example 16

The substitution of 2.14 parts of 17α-ethyl-2α-dimethylaminomethyl-5α-androstane-3β,17β-diol 3-propionate in the procedure of Example 9 results in 17α-ethyl-2-methylene-5α-androstane-3β,17β-diol 3-propionate, represented by the structural formula

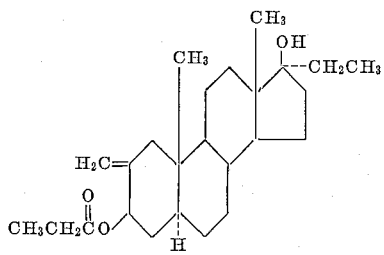

Example 17

By substituting 2.16 parts of 17α-ethyl-2-methylene-5α-androstane-3β,17β-diol 3-propionate and otherwise proceeding according to the processes described in Example 10. 17α-ethyl-2-methylene-5α-androstane-3β,17β-diol is obtained. It is represented by the structural formula

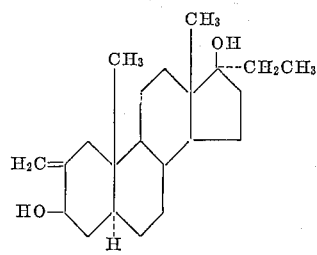

Example 18

The substitution of 6.7 parts of propionic anhydride in the procedure of Example 6 results in 2α-dimethylaminomethyl-5α-androstane-3β,17β-diol 3,17-dipropionate.

Example 19

By substituting 2.13 parts of 2α-dimethylaminomethyl-5α-androstane-3β,17β-diol 3,17-dipropionate and otherwise proceeding according to the processes of Example 8, 2-methylene-5α-androstane-3β,17β-diol 3,17-dipropionate is obtained. This compound is represented by the structural formula

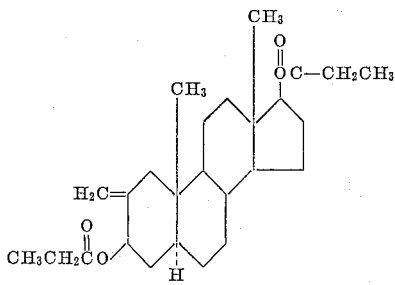

What is claimed is:

1. A compound of the structural formula

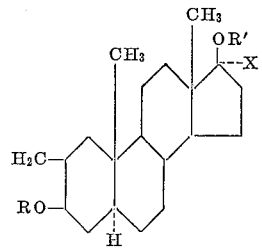

wherein R and R' are selected from the group consisting of hydrogen and lower alkanoyl radicals, and X is selected from the group consisting of hydrogen and lower alkyl radicals.

2. 2-methylene-5α-androstane-3β,17β-diol.

3. A compound of the structural formula

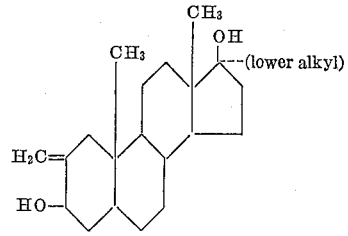

4. 17α-methyl-2-methylene-5α-androstane-3β,17β-diol.

5. A compound of the structural formula

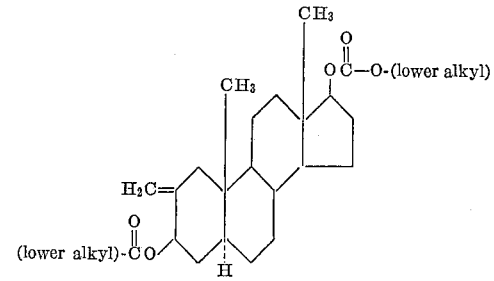

6. 2-methylene-5α-androstane-3β,17β-diol 3,17-diacetate.

7. A compound of the structural formula

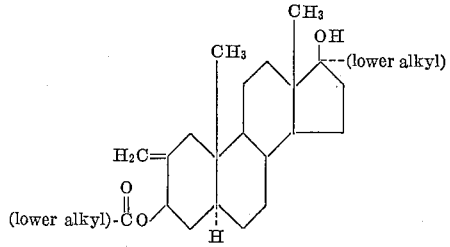

8. 17α-methyl-2-methylene-5α-androstane-3β,17β-diol 3-acetate.

No references cited.

LEWIS GOTTS, *Primary Examiner.*

IRVING MARCUS, *Examiner.*